United States Patent
Choi et al.

(10) Patent No.: US 7,840,702 B1
(45) Date of Patent: Nov. 23, 2010

(54) NETWORK HARD DISK COPY SYSTEM FOR MANAGING MULTIPLE CLIENTS

(75) Inventors: Seoung Il Choi, Gunpo-Si (KR); Jong Beom Moon, Seoul (KR); Jae Chun Ryu, Seongnam-Si (KR)

(73) Assignee: XIICNC Inc., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 12/755,607

(22) Filed: Apr. 7, 2010

(30) Foreign Application Priority Data

Jul. 28, 2009 (KR) .................... 10-2009-0068874

(51) Int. Cl.
*G06F 15/173* (2006.01)

(52) U.S. Cl. .................. 709/238; 709/224; 709/240; 709/241

(58) Field of Classification Search ............... 709/224, 709/238, 240, 241
See application file for complete search history.

(56) References Cited

U.S. PATENT DOCUMENTS

| | | | |
|---|---|---|---|
| 2004/0098426 A1* | 5/2004 | Ishii et al. | 707/204 |
| 2004/0143575 A1* | 7/2004 | Cherkasova | 707/10 |
| 2006/0161802 A1* | 7/2006 | Wang et al. | 714/4 |
| 2006/0271601 A1* | 11/2006 | Fatula et al. | 707/201 |

FOREIGN PATENT DOCUMENTS

| | | |
|---|---|---|
| JP | 2003-150427 | 5/2003 |
| KR | 2003-0016909 | 3/2003 |
| KR | 2006-0083165 | 7/2006 |

* cited by examiner

*Primary Examiner*—Joon H Hwang
*Assistant Examiner*—Chau D Le
(74) *Attorney, Agent, or Firm*—IPLA P.A.; James E. Bame (57) ABSTRACT

Disclosed herein is a network hard disk copy system for managing multiple clients. The system includes a main PC and sub PCs. The main PC generates a check parity signal, transmits it to sub PCs, receives response messages from the sub PCs, checks arrival times of the response messages, determines sub PCs which sent the response messages within a reference time to be those of a first group, copies data to the sub PCs of the first group, divides sub PCs which could not send the response messages within the reference time into groups, classifies sub PCs having faster response message arrival times as sub PCs of a higher group, generates and transmits global group information to sub PCs, and transmits group information output signals. The sub PCs extract their own group information from the global group information, and generate and output background images including the group information.

6 Claims, 4 Drawing Sheets

NETWORK HARD DISK COPY SYSTEM FOR MANAGING MULTIPLE CLIENTS

CROSS REFERENCE

This application claims foreign priority under Paris Convention and 35 U.S.C. §119 to Korean Patent Application No. 10-2009-0068874, filed Jul. 28, 2009 with the Korean Intellectual Property Office.

BACKGROUND OF THE INVENTION

1. Technical Field

The present invention relates, in general, to a network hard disk copy system based on Linux, and, more particularly, to a network hard disk copy system for managing multiple clients, which can minimize a waste of time and the loss of data when a main Personal Computer (PC) connected to a plurality of sub PCs over a network backs up data stored therein to the sub PCs.

2. Description of the Related Art

The present invention relates to a network hard disk copy system which manages multiple clients.

In the related art, separate hardware equipment has been mounted on a main PC or a special Local Area Network (LAN) card has been used so as to copy a plurality of hard disks connected to a network, thereby executing such a copy operation.

Further, even in the case of technology that is pure software based, a method using such technology is based on Windows, and thus the copy speed is very slow or a very complicated connection structure is realized.

As a representative example thereof, there is Norton Ghost which is configured such that a main PC is set, an image of the main PC is generated, a cast server is designated, and data is transmitted to the cast server using a stored image, thus enabling copying to be performed.

Since such conventional technology unconditionally transmits data to clients connected to the network regardless of network conditions in a multi-cast manner, there is a problem of the entire copy speed deteriorating when an abnormality occurs on the network or when some PCs under load are present. In this case, if it is assumed that 50 clients are connected to a main PC and an abnormality occurs on the performance of a single client, there are disadvantages in that the time required to copy the entire disk or transmit the data of the disk to the clients increases geometrically.

SUMMARY OF THE INVENTION

Accordingly, the present invention has been made keeping in mind the above problems occurring in the prior art, and an object of the present invention is to provide a network hard disk copy system for managing multiple clients, in which, when backing up data stored in a main PC to one or more sub PCs, the main PC determines in advance the data transfer rates of the sub PCs, eliminates sub PCs with data transfer rates which are less than a preset reference rate, generates a first group using the remaining sub PCs and performs processing to copy the data stored in the main PC to the sub PCs of the first group, and in which the sub PCs of the first group, to which the data stored in the main PC is copied, perform processing to copy the stored data to sub PCs to which the data stored in the main PC has not been copied, thus increasing backup processing speed.

Another object of the present invention is to provide a network hard disk copy system for managing multiple clients, in which a main PC adopts a Linux Operating System (OS), thus enabling 1:N hard disk copying to be performed regardless of the contents of the disks of a plurality of PCs connected over a network.

A further object of the present invention is to provide a network hard disk copy system for managing multiple clients, in which group information indicating the data copy speeds of a plurality of sub PCs is output through the output units of the sub PCs, so that each user can easily find a high-performance PC and perform an operation on the found PC, thus providing convenience to the user.

In order to accomplish the above objects, the present invention provides a network hard disk copy system for managing multiple clients, the system backing up data stored in a main Personal Computer (PC) to one or more sub PCs, comprising a main PC for generating a check parity signal, transmitting it to all sub PCs, receiving response messages to the check parity signal from the sub PCs, checking times at which the response messages arrive, determining sub PCs which sent the response messages within a reference time to be sub PCs of a first group, copying the data stored in the main PC to the sub PCs of the first group, dividing sub PCs which could not send the response messages within the reference time into two or more groups depending on the arrival times of the response messages, classifying sub PCs having faster response message arrival times as sub PCs of a higher group, generating global group information which includes identification information of all of the sub PCs connected to the main PC and the identification information-based group information, transmitting the global group information to all of the sub PCs connected to the main PC, and transmitting group information output signals which enable the sub PCs' own group information to be output to the individual sub PCs when completion signals indicating that copying of the data stored in the main PC has been completed are received from all of the sub PCs connected to the main PC; and one or more sub PCs for, when receiving the group information output signals from the main PC, extracting their own group information from the global group information received from the main PC, generating background images including their own group information in backgrounds of the sub PCs, and outputting the background images.

Preferably, the sub PCs of the first group to which the data stored in the main PC is copied are operated to copy the data stored in the main PC to sub PCs, which could not send the response messages within the reference time, using the global group information received from the main PC.

Preferably, the main PC copies the data stored in the main PC to the sub PCs of the first group, and the main PC and the sub PCs of the first group, in which copying of the stored data has been completed by the main PC, are operated to copy the stored data to sub PCs of groups lower than the first group so that the stored data is sequentially copied in a sequence of sub PCs of a higher group to a lower group from among sub PCs which are waiting for copying.

Preferably, the main PC determines sub PCs which sent the response messages within the reference time to be sub PCs of the first group, determines sub PCs which sent the response messages within a second preset time to be sub PCs of a second group, determines sub PCs which sent the response messages within a third preset time to be sub PCs of a third group, determines sub PCs which sent the response messages within a fourth preset time to be sub PCs of a fourth group, determines sub PCs which sent the response messages within a fifth preset time to be sub PCs of a fifth group, determines sub PCs which sent the response messages within a sixth preset time to be sub PCs of a sixth group, and determines sub PCs which sent the response messages within a seventh preset time to be sub PCs of a seventh group.

Preferably, the reference time is less than the second preset time, the second preset time is less than the third preset time, the third preset time is less than the fourth preset time, the fourth preset time is less than the fifth preset time, the fifth preset time is less than the sixth preset time, and the sixth preset time is less than the seventh preset time.

Preferably, each of the main PC and the one or more sub PCs adopts a Linux operating system.

Preferably, the check parity signal comprises a flag bit field in which information about whether a response message is returned normally or abnormally is recorded; a parity bit field in which identification information of each sub PC is recorded; and a storage bit field in which test storage data is recorded, and wherein each of the response messages transmitted from the sub PCs which received the check parity signal is configured such that '0' is recorded in the flag bit field of the received check parity signal when the response message is returned abnormally, whereas '1' is recorded in the flag bit field when the response message is returned normally.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, embodiments of a network hard disk copy system for managing a plurality of clients according to the present invention will be described in detail with reference to the attached drawings.

Figure 1:
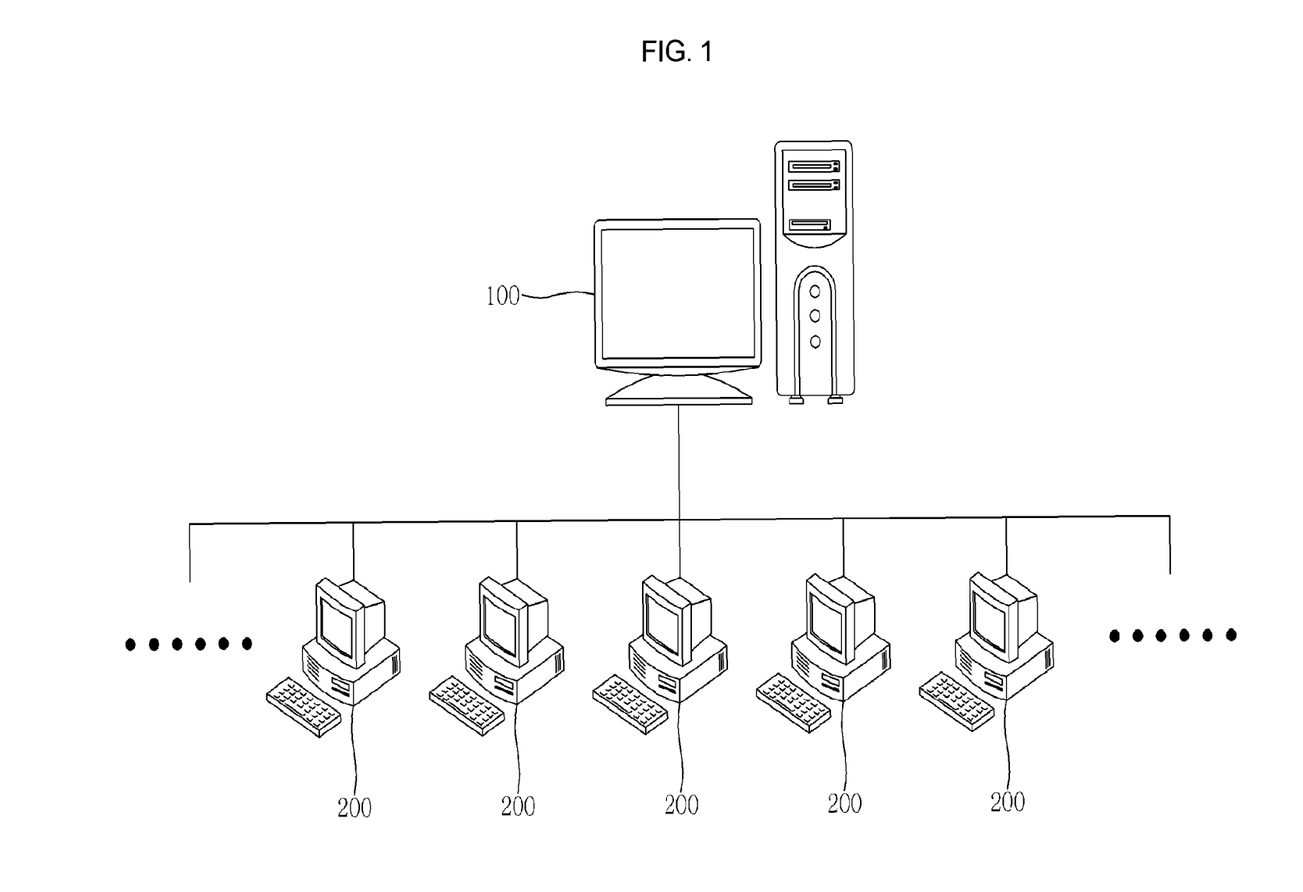
FIG. 1 is a block diagram showing the internal construction of a network hard disk copy system for managing multiple clients according to an embodiment of the present invention.

FIG. 1 is a block diagram showing the internal construction of a network hard disk copy system for managing multiple clients according to an embodiment of the present invention.

As shown in FIG. 1, the present invention includes a main PC 100 and one or more sub PCs 200 connected together over a network.

The main PC 100 queries whether to transmit a check parity signal to the one or more sub PCs 200 connected thereto through the output unit of the main PC 100 when the times at which response messages from the sub PCs 200 to the transmission of a check parity signal will arrive have been previously stored in a storage unit. When a response indicating that a check parity signal will be transmitted has been received through the input unit of the main PC 100 as a result of the query, or when the arrival times of response messages from the sub PCs to the transmission of a check parity signal are not stored in the storage unit, the main PC 100 generates a check parity signal and transmits the check parity signal to all of the sub PCs 200.

In this case, the check parity signal is a means for determining how fast a corresponding sub PC can perform backup. That is, since it is inefficient to perform an operation of transmitting a check parity signal whenever backup is performed, it is preferable to query an operator about the transmission of a check parity signal in advance and transmit a check parity signal based on the results of the query.

According to the above description, since a check parity signal is not unnecessarily transmitted in a situation in which there is no need to transmit a check parity signal (for example, a situation in which the check parity signal was transmitted one hour ago and then the performance of the sub PCs has already been detected), there is an advantage in that a backup operation can be efficiently executed.

Meanwhile, when the main PC 100 queries whether to transmit a check parity signal to the one or more sub PCs connected thereto through the output unit, and receives a response, indicating that a check parity signal will not be transmitted, through the input unit as a result of the query, the main PC 100 reads from the storage unit the response message arrival times of the sub PCs to the transmission of the check parity signal, determines sub PCs which sent the response messages within a reference time to be sub PCs of a first group, and copies the data stored in the main PC to the sub PCs of the first group.

Further, when the main PC 100 transmits the check parity signal to the sub PCs 200 connected thereto, the main PC 100 receives response messages to the check parity signal from the sub PCs 200, stores and checks times at which the response messages will arrive, determines sub PCs 200 which sent the response messages within the reference time to be sub PCs of a first group, and performs processing to copy the data stored in the main PC 100 to the sub PCs 200 of the first group.

Further, the main PC 100 divides sub PCs which could not transmit the response messages within the reference time into two or more groups depending on the arrival times of the response messages and classifies a group having faster response message arrival times as a higher group. The main PC 100 generates global group information including the identification information of all of the sub PCs 200 connected to the main PC 100 (for example, the IP addresses of the sub PCs 200) and the identification information-based group information (for example, information about groups for the IP addresses of the respective sub PCs), and transmits the global group information to all of the sub PCs 200 connected to the main PC 100. Further, when completion signals, indicating that copying of the data stored in the main PC 100 to the sub PCs 200 has been completed, are received from all of the sub PCs 200 connected to the main PC 100, the main PC 100 transmits group information output signals, which enable the individual sub PCs' own group information to be output, to the corresponding sub PCs 200.

In this case, a check parity signal preferably has a flag bit field in which information about whether a response message is returned normally or abnormally is recorded, a parity bit field in which the identification information of each sub PC is recorded, and a storage bit field in which test storage data is recorded. A response message, sent by a sub PC which received the check parity signal, is preferably configured such that '0' is recorded in the flag bit field of the received check parity signal when the response message is returned abnormally, whereas '1' is recorded in the flag bit field when the response message is returned normally.

In more detail, the check parity signal is composed of a total of 32 bits, wherein the flag bit field is one bit, the parity bit field is 15 bits, and the test storage data field is 16 bits.

Meanwhile, the sub PCs 200 may be grouped depending on the times at which they send response messages to the main PC 100. In this case, the sub PCs 200 of the first group to which the data stored in the main PC 100 is copied perform processing to copy the data stored in the main PC 100 to the sub PCs 200, which could not transmit response messages within the reference time, using the global group information received from the main PC 100.

That is, when data is copied over the relevant network, the main PC 100 performs multi-dimensional transmission in such a way that primary transmission is performed on PCs having the highest network efficiency (for example, the sub PCs of the first group in the present embodiment), and that sub PCs to which the transmitted data is copied (for example, the sub PCs of the first group in the present embodiment) act as a main PC and secondary transmission is performed.

Meanwhile, the sub PCs 200 which could not transmit the response messages within the reference time can be divided into two or more groups.

In this case, the main PC 100 determines the sub PCs 200 which sent response messages within the reference time to be sub PCs of the first group, determines sub PCs 200 which sent response messages within a second preset time to be sub PCs of a second group, determines sub PCs 200 which sent response messages within a third preset time to be sub PCs of a third group, determines sub PCs 200 which sent response messages within a fourth preset time to be sub PCs of a fourth group, determines sub PCs which sent response messages within a fifth preset time to be sub PCs of a fifth group, determines sub PCs which sent response messages within a sixth preset time to be sub PCs of a sixth group, determines sub PCs which sent response messages within a seventh preset time to be sub PCs of a seventh group, and transmits the global group information of the sub PCs to the sub PCs of each group.

In this case, the reference time is less than the second preset time, the second preset time is less than the third preset time, the third preset time is less than the fourth preset time, the fourth preset time is less than the fifth preset time, the fifth preset time is less than the sixth preset time, and the sixth preset time is less than the seventh preset time.

Further, the main PC 100 performs processing such that the data stored in the main PC 100 is copied to the sub PCs of the first group. The main PC and the sub PCs in which the copying of the stored data has been completed by the main PC perform processing to copy the data, stored in the main PC, to sub PCs belonging to groups lower than the group to which they currently belong so that the data can be sequentially copied in the sequence of sub PCs of a higher group to a lower group from among sub PCs which are waiting for copying.

For the sake of understanding of the description, a description will be made using an example in which one main PC 100 and 10 sub PCs 200 are present.

Further, a description will also be made using an example in which the main PC 100 sets sub PCs which sent response messages within 0.3 seconds as sub PCs of a first group, sets sub PCs which sent response messages within 0.5 seconds as sub PCs of a second group, and sets sub PCs which sent response messages within 0.7 seconds as sub PCs of a third group.

The main PC 100 generates a check parity signal and transmits it to the 10 sub PCs 200 connected thereto over a network. At this time, the 10 sub PCs 200 which have received the check parity signal send response messages to the check parity signal to the main PC 100.

The main PC 100 searches for the times at which the response messages sent from the sub PCs 200 arrive. Results of the search show that three sub PCs PC1, PC2 and PC3 sent the response messages within 0.3 seconds, the sub PCs PC4, PC5, PC6 and PC7 sent the response messages within 0.5 seconds, and sub PCs PC8, PC9 and PC10 sent the response messages within 0.7 seconds.

Then, the main PC 100 determines the three sub PCs PC1, PC2 and PC3 to be sub PCs of the first group, the four sub PCs PC4, PC5, PC6 and PC7 to be sub PCs of the second group, and the three sub PCs PC8, PC9 and PC10 to be sub PCs of the third group. Further, the main PC 100 transmits the global group information to the individual sub PCs (the sub PCs PC1 to PC10 in the present embodiment). In this case, the global group information includes the identification information of the PCs and the identification information-based group information, and may be designated in the present embodiment as "PC1:IP:100.10.10-first group, PC2:IP:100.10.11-first group, PC3:IP:100.10.12-first group, PC4:IP:100.10.13-second group, PC5:IP:100.10.14-second group, PC6:IP:100.10.15-second group, PC7:IP:100.10.16-second group, PC8:IP:100.10.17-third group, PC9:IP:100.10.18-third group, and PC10:IP:100.10.19-third group."

Thereafter, the main PC 100 performs processing such that the data stored in the main PC is copied to the sub PCs (in the present embodiment, PC1, PC2 and PC3) of the first group. After a predetermined period of time has passed, the main PC 100 and the sub PCs of the first group (in the present embodiment, PC1, PC2 and PC3), in which the copy of the data has been completed by the main PC 100, perform processing to copy the data, stored in the main PC 100, to the sub PCs of groups (in the present embodiment, the second group and the third group) lower than the first group to which they currently belong.

In this case, copy is sequentially processed in the sequence of sub PCs of a higher group to a lower group from among sub PCs which are waiting for copying. That is, the main PC 100 and the sub PCs of the first group (in the present embodiment, PC1, PC2 and PC3), in which the copying of the data has been completed, may copy the stored data to the sub PCs of the second and third groups which are groups lower than the first group, but primarily copy the stored data to the sub PCs of the second group which is a higher group from among sub PCs waiting for copying.

Then, the main PC 100 and the sub PCs of the first group (in the present embodiment, PC1, PC2 and PC3) in which the copying of the data has been completed are operated to copy the stored data to the sub PCs of the second group (in the present embodiment, PC4, PC5, PC6 and PC7).

Thereafter, PCs in which the copying of the stored data thereto has been completed are operated to copy the stored data to sub PCs which are waiting for copying (in the present embodiment, sub PCs PC8, PC9 and PC10).

For example, when the main PC 100 and the sub PCs PC1 and PC3 have completed a copy operation, the main PC 100 and the sub PCs PC1 and PC3 respectively copy the stored data to the sub PCs PC8, PC9 and PC10 of the third group which are waiting for copying.

According to the above-described construction, there is an advantage of providing a method of promptly detecting a specific event such as the occurrence of a load, the loss of data or the deterioration of speed on a network and coping with the event when such an event occurs on the network, thus securely and rapidly copying data compared to a multicast or broadcast method which is a conventional transmission method. Further, there is an advantage in that a data loss rate on the relevant network can be analyzed so as to minimize loss attributable to data interference that may occur when data is transmitted over the network.

In this case, it is preferable for each of the main PC 100 and the one or more sub PCs 200 to adopt a Linux Operating System (OS).

Further, when receiving completion signals, indicating that the copying of the data stored in the main PC 100 to all of the sub PCs 200 connected to the main PC 100 has been completed, from the sub PCs 200, the main PC 100 transmits to the individual sub PCs 200 group information output signals which enable the group information of the sub PCs 200 to be output to the output units of the sub PCs 200.

Figure 4:
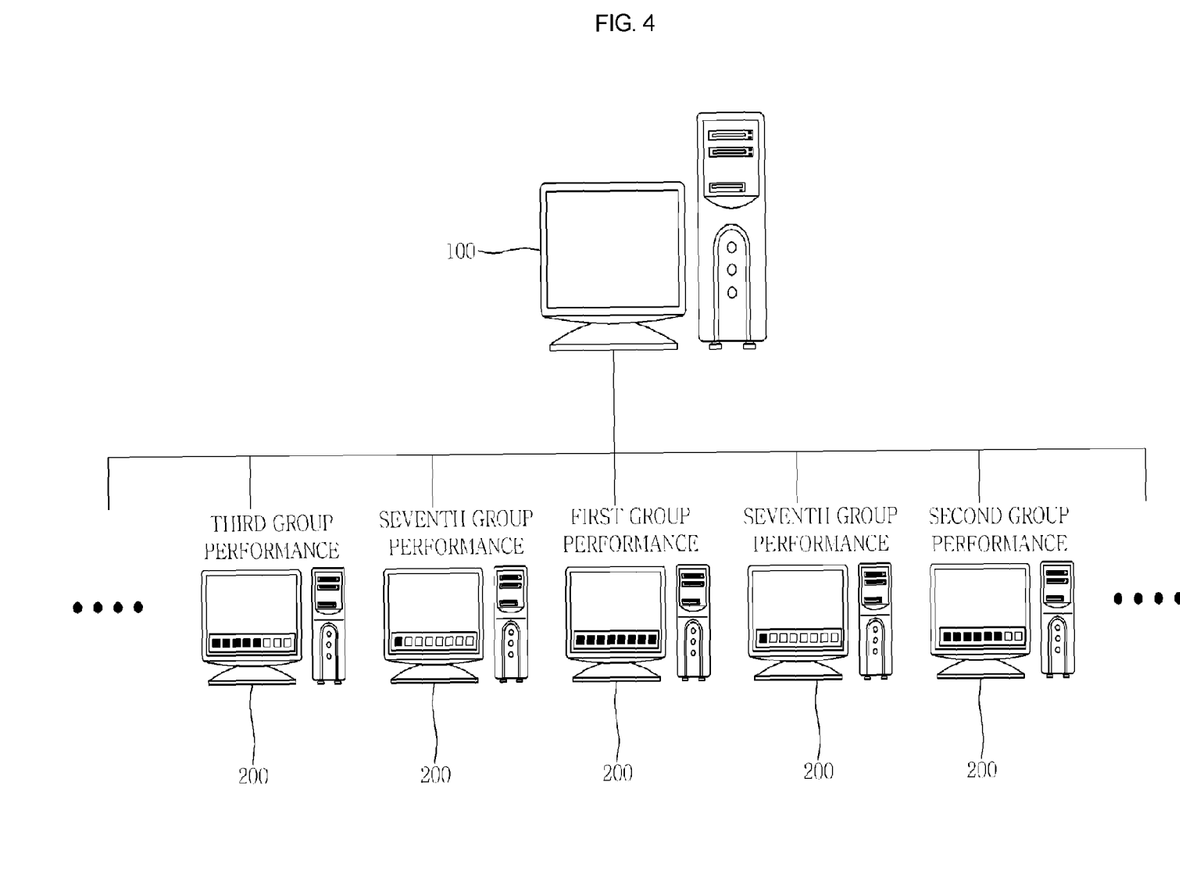
FIG. 4 is a diagram illustrating the state in which the network hard disk copy system for managing multiple clients is operated according to an embodiment of the present invention.

When receiving the group information output signals from the main PC 100, each of the sub PCs 200 extracts its own group information from the global group information received from the main PC 100, generates a background image including its own group information in the background, and outputs the background image to the output unit of the relevant sub PC 200. The state in which the group information is output through the output units of the sub PCs 200 is shown in FIG. 4.

As described above, when the group information of the individual sub PCs 200 is output through the output units, there is an advantage in that users can easily select PCs having higher group information, that is, high-performance PCs, from among the plurality of sub PCs 200 and can perform operations on the selected PCs. When, as described above, the group information of the sub PCs 200 is output to the output units in a space in which the plurality of sub PCs 200 is present, there is an advantage in that the benefit of allowing a user who has promptly accessed the space to use a higher-performance PC can be provided. That is, the fact that the group information is output through an output unit means that the group information is forcibly output to the background, and the user can determine the performance of each PC when viewing the group information displayed on the background.

Hereinafter, the operating process of the network hard disk copy system for managing multiple clients will be described in detail with reference to the attached drawings.

Figure 2:
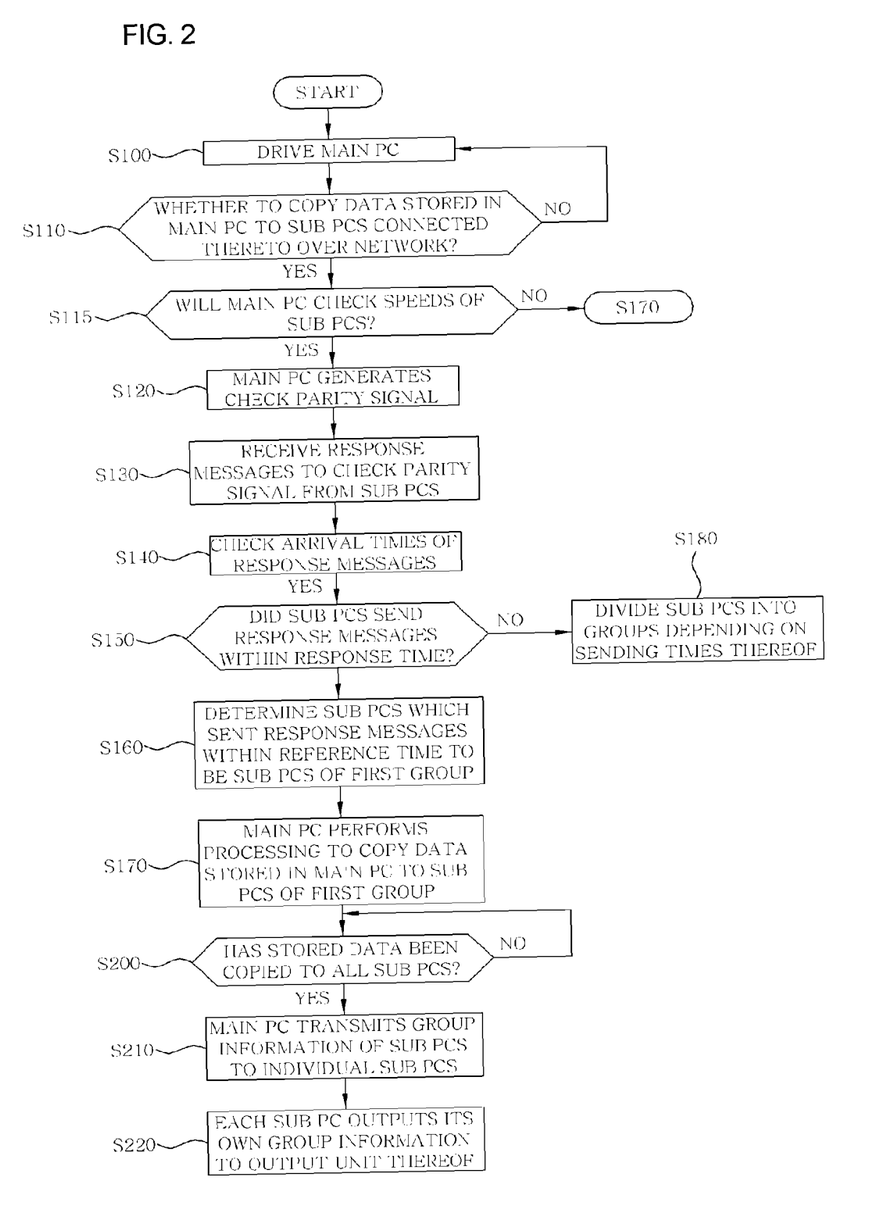
FIG. 2 is a flowchart showing the operating process of the network hard disk copy system for managing multiple clients according to an embodiment of the present invention.
Figure 3:
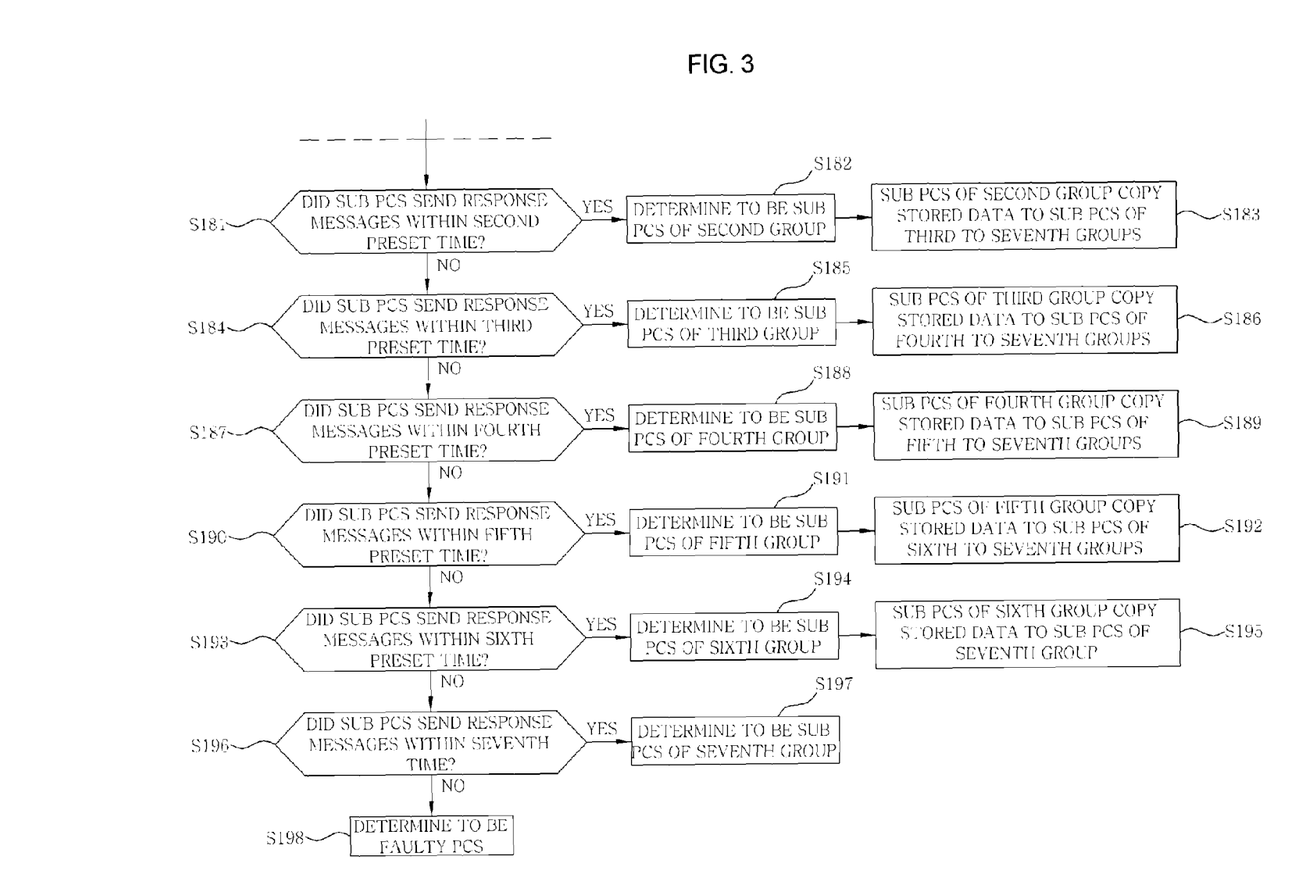
FIG. 3 is a flowchart showing the detailed operating process of step S180 of FIG. 2.

FIG. 2 is a flowchart showing the operating process of the network hard disk copy system for managing multiple clients according to an embodiment of the present invention, and FIG. 3 is a flowchart showing the detailed operating process of step S180 of FIG. 2.

Referring to FIG. 2, a main PC 100 in which a Linux core is installed is booted up in a network environment in which PCs are connected together via the same hub or switch. Such a booted main PC 100 waits for sub PCs 200 to be connected thereto. In this case, one or more sub PCs 200 are booted up using a Pre-boot eXecution Environment (PXE) or their own Compact Disk (CD) Read Only Memory (ROM) for booting. Then, the main PC 100 senses one or more booted sub PCs 200, and thereafter starts to communicate with the sub PCs 200 at step S100.

Then, the main PC 100 checks various types of options on stored data desired to be copied to the one or more sub PCs 200 (for example, copying between disks, the copying of individual partitions, copying using previously produced images, etc.), and enters a data transmission preparation procedure at step S110.

Thereafter, when the arrival times of response messages from the sub PCs to the transmission of a check parity signal have been previously stored in the storage unit of the main PC 100, the main PC 100 queries whether to transmit a check parity signal to the one or more sub PCs 200 connected thereto through the output unit of the main PC 100 at step S115.

As a result of the query at step S115, when the main PC 100 receives a response, indicating that a check parity signal will not be transmitted, the main PC 100 reads the response message arrival times of the sub PCs, stored in the storage unit, determines sub PCs which sent response messages within a reference time to be sub PCs of a first group, and copies the data stored in the main PC to the sub PCs of the first group.

Meanwhile, as a result of the query at step S115, when the main PC 100 receives a response, indicating that a check parity signal will be transmitted, through the input unit of the main PC 100 or when the response message arrival times of the sub PCs to the transmission of a check parity signal are not stored in the storage unit, the main PC 100 generates a check parity signal and continuously transmits the check parity signal to the one or more sub PCs 200 at step S120. In this case, the check parity signal includes a flag bit field in which information about whether a response message is returned normally or abnormally is recorded, a parity bit field in which the identification information of each sub PC is recorded, and a storage bit field in which test storage data is recorded.

Further, the main PC 100 receives response messages to the check parity signal from the one or more sub PCs 200 at step S130, and checks and stores the times at which the response messages arrive at step S140.

Here, the main PC 100 extracts sub PCs which sent response messages within the reference time on the basis of the response message arrival times obtained at step S140, and determines the sub PCs to be sub PCs of a first group at steps S150 and S160. Preferably, each of the response messages is configured such that '0' is recorded in the flag bit field of the received check parity signal when the response message is returned abnormally, whereas '1' is recorded in the flag bit field when the response message is returned normally.

Thereafter, the main PC 100 copies the data stored in the main PC to the sub PCs belonging to the first group at step S170. Further, when the data stored in the main PC 100 is copied to the sub PCs of the first group at step S170, the sub PCs of the first group are operated to copy the data stored in the main PC to sub PCs which could not send response messages within the reference time.

That is, when the reception rate of a specific sub PC 200 decreases below a preset reference rate (in this case, the reception rate can be determined by, for example, the arrival times of response messages) while the main PC 100 transmits or receives the check parity signal or the response messages to or from the sub PCs 200, the main PC 10 may exclude the specific sub PC 200 from backup operation targets and resume the transmission of data from the time point at which the operation was interrupted, with the help of other sub PCs in which the backup operation has been completed.

Meanwhile, sub PCs which could not send the response messages within the reference time at the determination step S150 can be divided into two or more groups at step S180.

Step S180 will be described in detail with reference to FIG. 3. The main PC 100 determines the sub PCs which sent the response messages within the reference time to be sub PCs of the first group, and determines sub PCs which sent the response messages within a second preset time to be sub PCs of a second group at steps S181 and S182. Further, the main PC 100 determines sub PCs which sent the response messages within a third preset time to be sub PCs of a third group at steps S184 and S185, and determines sub PCs which sent the response messages within a fourth preset time to be sub PCs of a fourth group at steps S187 and S188. Furthermore, the main PC 100 determines sub PCs which sent the response messages within a fifth preset time to be sub PCs of a fifth group at steps S190 and S191, determines sub PCs which sent the response messages within a sixth preset time to be sub PCs of a sixth group at steps S193 and S194, determines sub PCs which sent the response messages within a seventh preset time to be sub PCs of a seventh group at steps S196 and S197, and transmits the global group information of the sub PCs to the individual sub PCs.

Here, the reference time is less than the second preset time, the second preset time is less than the third preset time, the third preset time is less than the fourth preset time, the fourth preset time is less than the fifth preset time, the fifth preset time is less than the sixth preset time, and the sixth preset time is less than the seventh preset time.

Meanwhile, the main PC performs processing such that the data stored in the main PC is copied to the sub PCs of the first group on the basis of the global group information. Thereafter, the main PC and the sub PCs of the first group in which the copying of the data has been completed perform processing such that the data stored in the main PC is copied to the sub PCs of the second to seventh groups on the basis of the global group information. In this case, it is preferable that copying be sequentially performed in the sequence of sub PCs of a higher group to a lower group from among the sub PCs which are waiting for copying.

Further, the main PC and the sub PCs of the first and second groups in which the copying of data has been completed perform processing such that the data stored in the main PC is copied to the sub PCs of the third to seventh groups on the basis of the global group information at step S183. Similarly, it is preferable that copying be sequentially performed in the sequence of the sub PCs of a higher group to a lower group from among sub PCs which are waiting for copying.

Furthermore, the main PC and the sub PCs of the first to third groups in which the copying of the data has been completed perform processing such that the data stored in the main PC is copied to the sub PCs of the fourth to seventh groups on the basis of the global group information at step S186. Similarly, it is preferable that copying be sequentially performed in the sequence of the sub PCs of a higher group to a lower group from among sub PCs which are waiting for copying.

Thereafter, the main PC and the sub PCs of the first to fourth groups in which the copying of the data has been completed perform processing such that the data stored in the main PC is copied to the sub PCs of the fifth to seventh groups on the basis of the global group information at step S189. Similarly, it is preferable that copying be sequentially performed in the sequence of the sub PCs of a higher group to a lower group from among sub PCs which are waiting for copying.

Further, the main PC and the sub PCs of the first to fifth groups in which the copying of the data has been completed perform processing such that the data stored in the main PC is copied to the sub PCs of the sixth to seventh groups on the basis of the global group information at step S192. Similarly, it is preferable that copying be sequentially performed in the sequence of the sub PCs of a higher group to a lower group.

Finally, the main PC and the sub PCs of the first to sixth groups in which the copying of the data has been completed perform processing such that the data stored in the main PC is copied to the sub PCs of the seventh group on the basis of the global group information at step S195.

Thereafter, when receiving completion signals, indicating that the copying of the data stored in the main PC 100 has been completed, from all of the sub PCs 200 connected to the main PC 100 at step S200, the main PC 100 transmits group information output signals which enable the sub PCs' own group information to be output to the output units of the sub PCs at step S210.

When receiving the group information output signals from the main PC 100, each of the sub PCs 200 extracts its own group information from the global group information received from the main PC 100, generates a background image including its own group information in the background, and outputs the background image to the output unit of the sub PC 200 at step S220. The state in which the group information is output through the output units of the sub PCs 200 is shown in FIG. 4.

According to the above description, there is an advantage of allowing users to easily select high-performance sub PCs and perform operations on the selected sub PCs in the space in which a plurality of sub PCs 200 is installed.

Further, the present invention is advantageous in that a waste of time and the loss of data can be minimized when the copying of data is performed over a network using the above-described method.

Table 1 indicates the comparison of the functions of the present invention with those of conventional products (Ghost and Reborncop Max) when stored data is intended to be copied. Table 1 shows an example in which the copy speed is P4 and 10 Gigabytes of data was actually used in a main PC and is desired to be transmitted to 50 sub PCs, each having a 200 Gigabyte-hard disk, in a training room.

TABLE 1

| | Present Invention | Ghost | Reborncop Max |
|---|---|---|---|
| Base OS | Linux | Windows/Dos | Windows/Dos |
| Solution configuration | S/W | S/W | H/W |
| MBR disk copying | Supported | Not supported | Not supported |
| Copy speed | 8 min | 20 min | 1 hour 30 min |
| Environment setting method | Simple (almost nothing) | Require environment setting time | Require HW mounting |
| Speed test | Supported | Not supported | Not supported |
| Copy failure rate | Very low | Medium | High |

As shown in Table 1, since the present invention uses a Linux core as an access scheme between a main PC and one or more server PCs, there are advantages in that all types of Local Area Network (LAN) cards can be supported without requiring separate setting, and in that, compared to similar products of other companies (Ghost or Reborncop Max), a waste of time and the loss of data can be minimized.

As described above, the present invention can provide a network hard disk copy system for managing multiple clients, in which, when backing up data stored in a main PC to one or more sub PCs, the main PC determines in advance the data transfer rates of the sub PCs, eliminates sub PCs with data transfer rates which are less than a preset reference rate, generates a first group using the remaining sub PCs and performs processing to copy data stored in the main PC to the sub PCs of the first group, and in which the sub PCs of the first group, to which the data stored in the main PC is copied, perform processing to copy the stored data to sub PCs to which the data stored in the main PC has not been copied, thus increasing backup processing speed.

Further, the preset invention can provide a network hard disk copy system for managing multiple clients, in which a main PC adopts a Linux Operating System (OS), thus enabling 1:N hard disk copying to be performed regardless of the contents of the disks of a plurality of PCs connected over a network.

Furthermore, the present invention can provide a network hard disk copy system for managing multiple clients, in which group information indicating the data copy speeds of a plurality of sub PCs is output through the output units of the sub PCs, so that each user can easily find a high-performance PC and perform an operation on the found PC, thus providing convenience to the user.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A network hard disk copy system for managing multiple clients, the system backing up data stored in a main Personal Computer (PC) to one or more sub PCs, comprising:

a main PC generating a check parity signal, transmitting the check parity signal to all sub PCs, receiving response messages to the check parity signal from the one or more sub PCs, checking arrival time of the response messages, determining sub PCs sent the response messages within a reference time to be sub PCs of a first group, copying the data stored in the main PC to the sub PCs of the first group, dividing sub PCs that did not send the response messages within the reference time into two or more groups depending on arrival times of the response messages, classifying sub PCs having faster response message arrival times as sub PCs of a higher group, generating global group information, wherein the global group information includes identification information of all of the sub PCs connected to the main PC and identification information-based group information, wherein the identification information-based group information includes the classified group information of all of the sub PCs, transmitting the global group information to all of the sub PCs connected to the main PC, and transmitting group information output signals enabling all of the sub PCs' own group information to be output to all of the sub PCs when completion signals indicating copying of the data stored in the main PC to all of the sub PCs has been completed are received from all of the sub PCs connected to the main PC; and one or more sub PCs, when receiving the group information output signals from the main PC, extracting each of the own sub PCs' group information from the global group information received from the main PC, generating background images including the extracted group information of the sub PCs in backgrounds of the sub PCs, and outputting the background images, wherein the sub PCs of the first group to which the data stored in the main PC is copied are operated to copy the data stored in the main PC from the sub PCs of the first group to the sub PCs in the two or more groups, wherein the sub PCs of the two or more groups did not send the response messages within the reference time, using the global group information received from the main PC.

2. The network hard disk copy system according to claim 1, wherein the main PC copies the data stored in the main PC to the sub PCs of the first group, upon copying of the stored data has been completed by the main PC, the sub PCs of the first group are operated to copy the stored data to sub PCs of groups lower than the first group so that the stored data is sequentially copied in a sequence of sub PCs of a higher group to a lower group from among sub PCs which are waiting for copying.

3. The network hard disk copy system according to claim 1, wherein:

the main PC determines sub PCs which sent the response messages within the reference time to be sub PCs of the first group, determines sub PCs which sent the response messages within a second preset time to be sub PCs of a second group, determines sub PCs which sent the response messages within a third preset time to be sub PCs of a third group, determines sub PCs which sent the response messages within a fourth preset time to be sub PCs of a fourth group, determines sub PCs which sent the response messages within a fifth preset time to be sub PCs of a fifth group, determines sub PCs which sent the response messages within a sixth preset time to be sub PCs of a sixth group, and determines sub PCs which sent the response messages within a seventh preset time to be sub PCs of a seventh group.

4. The network hard disk copy system according to claim 3, wherein:

the reference tune is less than the second preset time,
the second preset time is less than the third preset time,
the third preset time is less than the fourth preset time,
the fourth preset time is less than the fifth preset time,
the fifth preset time is less than the sixth preset time, and
the sixth preset time is less than the seventh preset time.

5. The network hard disk copy system according to claim 1, wherein each of the main PC and the one or more sub PCs adopts a Linux operating system.

6. The network hard disk copy system according to claim 1, wherein the check parity signal comprises:

a flag bit field in which information about whether a response message is returned normally or abnormally is recorded;

a parity bit field in which identification information of each sub PC is recorded; and a storage bit field in which test storage data is recorded, and wherein each of the response messages transmitted from the sub PCs which received the check parity signal is configured such that '0' is recorded in the flag bit field of the received check parity signal when the response message is returned abnormally, whereas '1' is recorded in the flag bit field when the response message is returned normally.

* * * * *